(12) United States Patent
Choe et al.

(10) Patent No.: US 12,617,695 B2
(45) Date of Patent: May 5, 2026

(54) FLUORITE-BASED MATERIAL THIN FILM AND SEMICONDUCTOR DEVICE COMPRISING THE SAME

(71) Applicant: Samsung Electronics Co., Ltd., Suwon-si (KR)

(72) Inventors: Dukhyun Choe, Suwon-si (KR); Jinseong Heo, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1217 days.

(21) Appl. No.: 17/520,005

(22) Filed: Nov. 5, 2021

(65) Prior Publication Data

US 2022/0169530 A1    Jun. 2, 2022

(30) Foreign Application Priority Data

Dec. 1, 2020    (KR) ........................ 10-2020-0165948
Apr. 12, 2021    (KR) ........................ 10-2021-0047342

(51) Int. Cl.
C01G 39/02         (2006.01)
(52) U.S. Cl.
CPC ................................... C01G 39/02 (2013.01)
(58) Field of Classification Search
None
See application file for complete search history.

(56) References Cited

U.S. PATENT DOCUMENTS 10,109,336 B1    10/2018  Frank et al.
2020/0055134 A1    2/2020  Heo et al.

FOREIGN PATENT DOCUMENTS

CN    110866349 A    3/2020
JP    3883613 B2    2/2007

OTHER PUBLICATIONS

Choe et al., "Unexpectedly low barrier of ferroelectric switching in HfO2 via topological domain walls," Materials Today, vol. 50. Nov. 2021. (Year: 2021).*
X. Y. Li, et al. "Domain Wall Motion in Perovskite Ferroelectrics Studied by the Nudged Elastic Band Method," The Journal of Physical Chemistry, vol. 122, pp. 3091-3100 (2018).
G. Catalan, et al. "Domain wall nanoelectronics," Reviews of Modern Physics, vol. 84, No. 1, pp. 119-156 (2012).
Hyun-Jae Lee, et al. "Scale-free ferroelectricity induced by flat phonon bands in Hf02," Science Reports, www.sciencemag.org., pp. 1-10 (2020).

(Continued)

*Primary Examiner* — David Sample
(74) *Attorney, Agent, or Firm* — Harness, Dickey & Pierce, P.L.C.

(57)         ABSTRACT

Provided is a fluorite-based material thin film including an orthorhombic crystal structure having a symmetric segment and a non-symmetric segment; and at least two domains having different polarization directions. At least one of, the symmetric segment is not present at a wall between the domains, or at least two symmetric segments are consecutive. Also provided is a semiconductor device including the fluorite-based material thin film having an orthorhombic crystal structure. A polarization direction of the fluorite-based material thin film is configured to be changed by a structural transition between the symmetric segment and the non-symmetric segment.

13 Claims, 8 Drawing Sheets

(56) References Cited

OTHER PUBLICATIONS

Weitong Ding, et al. "The atomic-scale doman wall structure and motion in HfO2-based ferroelectrics: A first-principle study," Acta Materialia, vol. 196, pp. 556-564 (2020).

Partial European Search Report dated May 6, 2022 issued in European Patent Application No. 21210663.7-1103.

Cheema, et al. "Enhanced ferroelectricity in ultrathin films grown directly on silicon", Nature, Nature Publishing Group UK, vol. 580, No. 7804, pp. 478-482, XP037525868 (2020).

Muller, et al. "Ferroelectricity in Simple Binary ZrO 2 and HfO 2", Nano Letters, vol. 12, No. 8, pp. 4318-4323, XP055832178 (2012).

Sang, et al. "On the structural origins of ferroelectricity in HfO2thin films", Applied Physics Letters, American Institute of Physics, vol. 106, No. 16, XP012196840 (2015).

Hoffmann, et al. "Stabilizing the ferroelectric phase in doped hafnium oxide", Journal of Applied Physics, vol. 118, No. 7, pp. 072006-1, XP055670545 (2015).

Boscke et al "Ferroelectricity in hafnium oxide thin films", Applied Physics Letters, American Institute of Physics, vol. 99, No. 10, pp. 102903-102903, XP012152306 (2011).

Katayama, et al. "Orientation control and domain structure analysis of {100}-oriented epitaxial ferroelectric orthorhombic HfO2-based thin films", Journal of Applied Physics, American Institute of Physics, vol. 119, No. 13, XP012206516 (2016).

Richter, et al. "Si Doped Hafnium Oxide-A "Fragile" Ferroelectric System", Advanced Electronic Materials, vol. 3, No. 10, p. 1700131, XP055914979 (2017).

Shiraishi, et al. "Formation of the orthorhombic phase in CeO2—HfO2solid solution epitaxial thin films and their ferroelectric properties", Applied Physics Letters, American Institute of Physics, vol. 114, No. 23, XP012238470 (2019).

Extended European Search Report dated Aug. 8, 2022 issued in European Patent Application No. 21210663.7.

* cited by examiner

FIG. 3

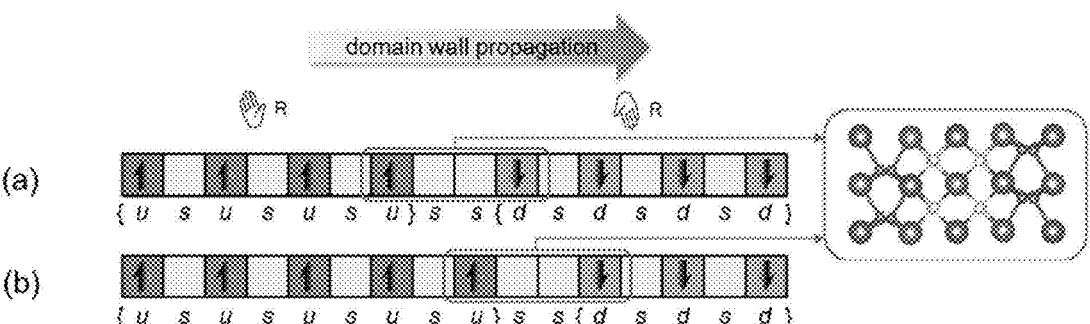

domain wall propagation (a)    { u  s  u  s  u  s  u } s  s { d  s  d  s  d  s  d }

| U~S$_x$~D | | When U and D have same chirality | When U and D have different chiralities |
|---|---|---|---|
| x=0 | (a) | { ···usu} {dsd···} | { ···usu} {dsd···} |
| | ↓ | | |
| | (b) | { ···ususu} {d···} | { ···ususu} {d···} |
| x=2 | (a) | { ···usu} ss {dsd···} | { ···usu} ss {dsd···} |
| | ↓ | | |
| | (b) | { ···ususu} ss {d···} | { ···ususu} ss {d···} |
| x=3 | (a) | { ···usu} sss {dsd···} | { ···usu} sss {dsd···} |
| | ↓ | | |
| | (b) | { ···ususu} sss {d···} | { ···ususu} sss {d···} |
| x=4 | (a) | { ···usu} ssss {dsd···} | { ···usu} ssss {dsd···} |
| | ↓ | | |
| | (b) | { ···ususu} ssss {d···} | { ···ususu} ssss {d···} |
| x=5 | (a) | { ···usu} sssss {dsd···} | { ···usu} sssss {dsd···} |
| | ↓ | | |
| | (b) | { ···ususu} sssss {d···} | { ···ususu} sssss {d···} |

FIG. 5
(a) normalized polarization(Q) vs. Time
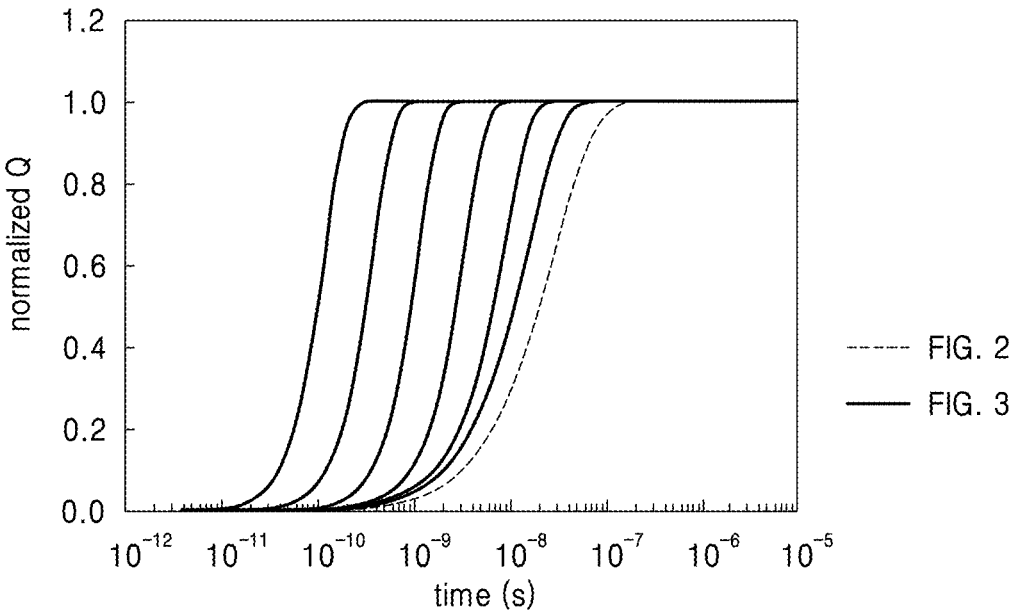
(b) the logarithmic switching current as a function of time in log scale
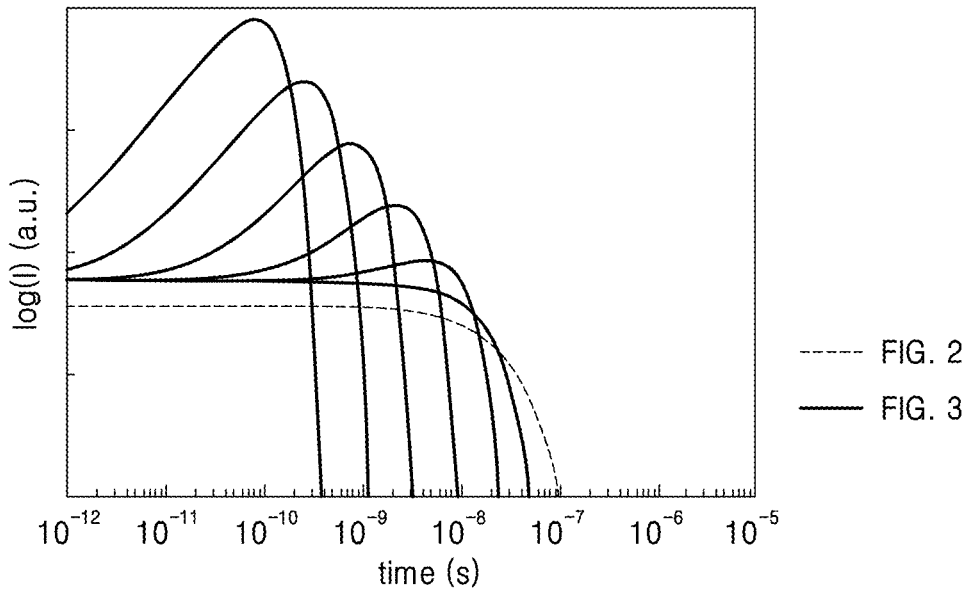

FLUORITE-BASED MATERIAL THIN FILM AND SEMICONDUCTOR DEVICE COMPRISING THE SAME

CROSS-REFERENCE TO RELATED APPLICATIONS

This application is based on and claims priority under 35 U.S.C. § 119 to Korean Patent Application Nos. 10-2020-0165948, filed on Dec. 1, 2020, and Korean Patent Application No. 10-2021-0047342, filed on Apr. 12, 2021, in the Korean Intellectual Property Office, the disclosures of each of which are incorporated by reference herein in their entirety.

BACKGROUND

Some example embodiments relate to a fluorite-based material thin film and/or a semiconductor device including the same.

According to the trend of electronic products toward being lighter, thinner, and/or smaller, the demand for high-integration of semiconductor devices is increasing. Accordingly, various types of semiconductor devices have been proposed. As an example, there is a semiconductor device including a ferroelectric layer.

SUMMARY

Provided is a fluorite-based material thin film having an improved or excellent polarization switching rate.

Alternatively or additionally, provided are a semiconductor device that is operable with low-electric power and has a high degree of integration and/or excellent operation rate, and/or an apparatus including the semiconductor device.

Additional aspects will be set forth in part in the description which follows and, in part, will be apparent from the description, or may be learned by practice of some example embodiments.

According to some example embodiments, a fluorite-based material thin film includes an orthorhombic crystal structure having a symmetric segment and a non-symmetric segment, and at least two domains having different polarization directions, wherein at least one of the symmetric segment is not present at a wall between the domains, or at least two symmetric segments are consecutive.

The symmetric segment may include, in a crystal lattice having of four oxygen ions and two metal ions, an atomic arrangement structure in which positions of the metal ions and oxygen ions have symmetry with respect to a polar c-axis. The non-symmetric segment may include, in a crystal lattice having four oxygen ions and two metal ions, an atomic arrangement structure in which positions of the metal ions and the oxygen ions have non-symmetry with respect to the polar c-axis. At least one of the domains may be a set of adjacent orthorhombic crystal structures having a same polarization direction.

The fluorite-based material thin film may include an atomic arrangement represented by $U\text{-}S_x\text{-}D$, wherein S is the symmetric segment, x is an integer of 0, 2, 3, 4, or 5, and U and D are the domains having different polarization direction from each other. U and D may be domains having a same chirality or different chiralities. Each of U and D may be a domain with an atomic arrangement in which the non-symmetric segment is arranged adjacent to $S_x$.

The fluorite-based material thin film may include a material represented by $MO_2$, wherein M is Hf, Zr, or a combination of Hf and Zr.

According to some example embodiments, a semiconductor device includes a fluorite-based material thin film having an orthorhombic crystal structure having a symmetric segment and a non-symmetric segment, wherein a polarization direction of the fluorite-based material thin film is configured to be changed through structural transition between the symmetric segment and the non-symmetric segment. The polarization direction may be configured to be changed while a structural transition of at least one of the symmetric segment to the non-symmetric segment or a structural transition of the non-symmetric segment to the symmetric segment occurs according to a direction in which an electric field is applied from the outside, and accordingly, a wall between the domains having different polarization directions propagates.

According to some example embodiments, an electronic component includes a ferroelectric layer, the ferroelectric layer including a plurality of unit cells extending in a first direction. A first portion of the plurality of unit cells includes first cells having a symmetric structure and second cells having a first asymmetric structure, the first having the symmetric structure alternating with the second cells having the first asymmetric structure, a second portion of the plurality of unit cells includes third cells having the symmetric structure and fourth cells having a second asymmetric structure, the third cells having the symmetric structure alternating with the fourth cells having the second asymmetric structure, and the first portion of the plurality of unit cells is adjacent to the second portion of the plurality of unit cells at a boundary, and at the boundary, one of the first cells having the symmetric structure is adjacent to one of the third cells having the symmetric structure. Alternatively or additionally, one of the second cells having the first asymmetric structure is adjacent to one of the fourth cells having the second asymmetric structure.

The electronic component may include a substrate and a gate electrode. The ferroelectric layer may be between the gate electrode and the substrate. The substrate may include a first lightly doped region, a second lightly doped region, and a channel region between the first doped region and the second doped region, the channel region under the ferroelectric layer. The substrate may include a first highly doped region, the first highly doped region having an impurity concentration greater than the first lightly doped region, and a second highly doped region, the second highly doped region having an impurity concentration greater than the second lightly doped region. The substrate may include a first pocket region, the first pocket region having a conductivity type different from the first lightly doped region, and a second pocket region, the second pocket region having a conductivity type different from the second lightly doped region.

BRIEF DESCRIPTION OF THE DRAWINGS

The above and other aspects, features, and/or advantages of certain embodiments of the disclosure will be more apparent from the following description taken in conjunction with the accompanying drawings, in which:

FIG. 3 is a schematic view showing a structure and domain wall propagation of a fluorite-based material thin film according to some example embodiments, in which (a) represents an atomic arrangement structure before domain wall propagation, and (b) represents an atomic arrangement structure when there is domain wall propagation;

FIG. 4 is a table showing domain wall propagation in fluorite-based material thin films according to embodiments, in which { . . . } and [ . . . ] represent right-handed chirality and left-handed chirality, respectively, (a) represents an atomic arrangement structure before domain wall propagation, and (b) represents an atomic arrangement structure when there is domain wall propagation;

FIG. 5 shows graphs showing results of calculating polarization switching times of a known fluorite-based material thin film and fluorite-based material thin films according to embodiments;

DETAILED DESCRIPTION OF SOME EXAMPLE EMBODIMENTS

Figure 1:
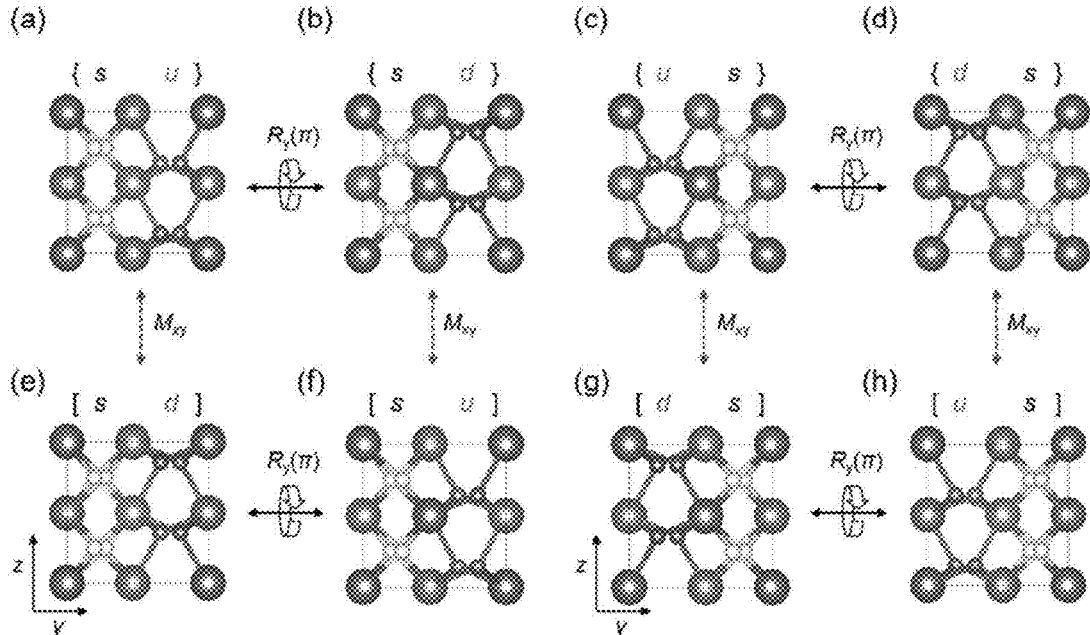
FIG. 1 is a schematic view of an orthorhombic crystal structure of a fluorite-based material, in which { . . . } and [ . . . ] represent right-handed chirality and left-handed chirality, respectively, $M_{xy}$ indicates an enantiomeric relationship, and $R_y(\pi)$ indicates a relationship of rotation by 180 degrees on the y axis.

Reference will now be made in detail to some example embodiments, examples of which are illustrated in the accompanying drawings, wherein like reference numerals refer to like elements throughout. In this regard, some example embodiments may have different forms and should not be construed as being limited to the descriptions set forth herein. Accordingly, example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

In the following description, terms are used only for explaining specific example embodiments while not limiting the scope of some example embodiments. When an element is referred to as being "above" or "on" another element, the element may be directly on an upper, lower, left, or right side of the other element while making contact with the other element or may be above an upper, lower, left, or right side of the other element without making contact with the other element.

The terms of a singular form may include plural forms unless otherwise mentioned. Unless otherwise mentioned, the terms "comprises" and/or "comprising" used herein specify the presence of stated features, numbers, steps, processes, elements, components, materials, or combinations thereof but do not preclude the presence or addition of one or more other features, numbers, steps, processes, elements, components, materials, or combinations thereof.

Although terms such as "first," "second," and "third" are used to describe various elements, the terms are only used to distinguish one element from other elements, and the features of the elements such as order and type should not be limited by the terms. In addition, terms such as "unit," "means," "module," or "portion" may refer to a unit of a comprehensive structure that has at least one function or operation and may be implemented with hardware, software, or a combination of hardware and software.

Hereinafter, some example embodiments will be described with reference to the accompanying drawings. In the drawings, like reference numerals refer to like elements, and the sizes of elements (such as the widths and thicknesses of layers or regions) may be exaggerated for clarity of illustration. Some example embodiments described herein are for illustrative purposes only, and various modifications may be made therein.

Ferroelectrics are materials with ferroelectricity and maintain spontaneous polarization by alignment of internal electric dipole moments even when an external electric field is not applied to the materials. For example, ferroelectrics are materials in which a polarization (or an electric field) remains semi-permanently in the materials even when a certain voltage is applied to the materials and then again the voltage returns to 0V, and the polarization direction may vary according to an external electric field.

Alternatively or additionally, ferroelectrics may have a negative capacitance in a certain region, and this characteristic may contribute to the low-power operation of semiconductor devices. For example, when a ferroelectric is applied to a transistor, a subthreshold swing value may drop to 60 mV/dec or less, which is the theoretical limit of an existing silicon-based transistor.

Meanwhile, it is known recently that materials having a fluorite structure/face-centered cubic (FCC) structure, e.g. fluorite-based materials such as a hafnium-based oxide (HfO) materials, have spontaneous polarization in an orthorhombic crystal structure, and may exhibit ferroelectricity. Hafnium-based oxides are expected to be useful for the miniaturization of semiconductor devices because hafnium-based oxides are suitable for application to semiconductor processing and have ferroelectricity even in thin films of a very small thickness of several nanometers.

However, a fluorite-based material such as a hafnium-based oxide may have a lower polarization switching rate than that of perovskite-based ferroelectrics, such as $PbTiO_3$, and thus, may have a negative impact on the operation speed of a semiconductor device. Fluorite-based materials may include one or more domains that have a same polarization direction and are defined as a set of orthorhombic crystal structures that are located adjacent each other, and a domain wall may be defined between domains having different polarization directions. The overall polarization direction of fluorite-based materials may change with domain wall propagation. However, fluorite-based materials may have a low polarization switching rate due to high and/or repeating energy barriers during polarization switching.

According to some example embodiments, a fluorite-based material thin film having a high polarization switching rate and/or a semiconductor device including the same may be provided.

As described above, the fluorite-based material may have spontaneous polarization in an orthorhombic crystal structure. FIG. 1 is a schematic view of an orthorhombic crystal structure of a fluorite-based material. Referring to FIG. 1, the orthorhombic crystal structure consists of (or includes) a symmetric segment (s) and a non-symmetric segment (u/d). The symmetric segment (s) may have a structure consisting of or including four oxygen ions and two metal ions, wherein the oxygen ions may be arranged on a central plane between the two metal ions. Accordingly, the symmetric segment (s) has symmetry of the positions of the metal ions and the oxygen ions with respect to a polar c-axis, and may not affect polarization of a material. The non-symmetric segment (u/d) may be arranged such that oxygen ions are off from or not aligned with the central plane between two metal ions. Accordingly, the non-symmetric segment (u/d) may have asymmetry of the positions of the metal ions and the oxygen ions with respect to a polar c-axis, and may affect polarization of a material. The non-symmetric segment (u/d) may have a "u" form or a "d" form according to the polarization direction ((−)→(+)), depending on the position of the oxygen ions and metal ions. Alternatively or additionally, the orthorhombic crystal structure of the fluorite-based material may have atomic arrangements (a) to (h) of FIG. 1 according to a chirality and/or a diffraction angle.

Figure 2:
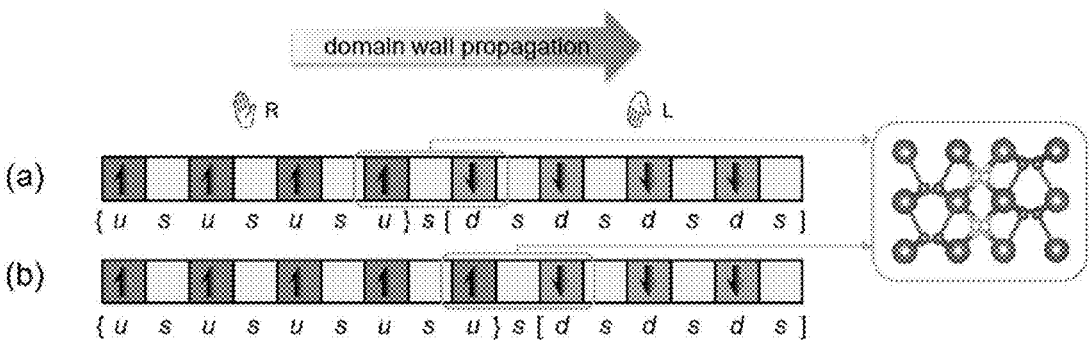
FIG. 2 is a schematic view showing a structure and domain wall propagation of a known fluorite-based material thin film, in which (a) represents an atomic arrangement structure before domain wall propagation, and (b) represents an atomic arrangement structure when there is domain wall propagation.

FIG. 2 is a schematic view showing a structure and domain wall propagation of a fluorite-based material thin film. The fluorite-based material thin film includes domains may include domains (for example, {usususu} and [dsdsdsds]) having different polarization directions and chiralities, and may include one symmetric segment at a domain wall between the domains. The chiralities are represented by the hand. The fluorite-based material thin film may have a low polarization switching rate due to a structure in which the symmetric segments (s) and non-symmetric segments (u/d) alternate. For example, the polarization direction of the known fluorite-based material thin film can change through or based on an atomic arrangement change between the non-symmetric segments (u and d) at the domain wall (structural change between (a) and (e) of FIG. 1). Referring to (a) and (b) of FIG. 1, the domain wall may propagate. However, during this process, a high-energy barrier is estimated to appear repeatedly due to structural invariance (and/or structural restoration) of the symmetric segment (s) and/or structural changes between the non-symmetric segments (u⟷d) and/or changes in chirality, and/or the like. This can be a factor that may slow down the polarization switching rate of the fluorite-based material thin film.

In a semiconductor device according to some example embodiments, the polarization direction is changeable through or configured to be changed by a structural transition between the symmetric segment and the non-symmetric segment of the fluorite-based material thin film.

For example, the fluorite-based material thin film may not include the symmetric segment (s) and/or may include at least two consecutive symmetric segments (s). FIG. 3 is a schematic view showing a structure and domain wall propagation of a fluorite-based material thin film according to some example embodiments. The polarization direction of the fluorite-based material thin film is changeable or is configured to change while a structural transition from the symmetric segment (s) to the non-symmetric segment (u), and/or from the non-symmetric segment (d) to the symmetric segment (s), occurs at the domain wall. Referring to (a) and (b) of FIG. 3, a domain wall may propagate, e.g. propagate in a first direction. Alternatively or additionally, in the polarization switching process, while the number of symmetric segments at the domain wall is maintained, the domain wall may propagate in a zipper-like form or manner. For example, in the fluorite-based material thin film according to some example embodiments, during polarization switching, the symmetric/non-symmetric segments may continuously undergo certain structural changes, and thus the energy barrier may be relatively low.

Alternatively or additionally, in the fluorite-based material thin film according to some example embodiments, adjacent domains may have a same chirality, and may maintain the chirality to be the same even after polarization switching (considering a structural change between (a) and (d) of FIG. 1). In FIG. 3, the chiralities are represented by the hands. According to studies based on some example embodiments, in a case of polarization switching without a change in chirality, the energy barrier is lower than that in the case of polarization switching with changing chirality.

The fluorite-based material thin film according to some example embodiments may include an atomic arrangement represented by U-$S_x$-D. Here, S is the symmetric segment, x is an integer of 0, 2, 3, 4, or 5, and U and D are the domains having different polarizations. Herein, x may not be 1, and may not be more than 5; however, example embodiments are not necessarily limited thereto. For example, in U, which has an atomic arrangement of repeating non-symmetric segments (u) or up and symmetric segments (s), which are denoted by u and s, respectively, the non-symmetric segment (u) may be linked with $S_x$. Meanwhile, in D, which has an atomic arrangement of repeating non-symmetric segments (d) or down, denoted by d, and symmetric segments (s), the non-symmetric segments (d) may be linked with $S_x$. Herein, the domains U and D may have the same or different chiralities. For example, the fluorite-based material thin film may include, at the wall between two domains having different polarization directions, an atomic arrangement represented by { . . . usu}{dsd . . . }, . . . usu}ss{dsd . . . }, { . . . usu}sss{dsd . . . }, { . . . usu}ssss{dsd . . . }, { . . . usu}sssss{dsd . . . }, { . . . usu}[dsd . . . ], { . . . usu}ss[dsd . . . ], { . . . usu}sss[dsd . . . ], { . . . usu}ssss[dsd . . . ], or { . . . usu}sssss[dsd . . . ], wherein { . . . } and [ . . . ] represent a right-handed chirality and left-handed chirality, respectively. The propagation of the domain wall of the fluorite-based material thin film may be represented in FIG. 4.

Each of the non-symmetric segments (u) and (d), and each of the symmetric segments (s), may be referred to as a unit cell. The unit cells may be arranged to extend in a first direction.

The fluorite-based material thin film may have a thickness of about 20 nm or less. For example, the fluorite-based material thin film may have a thickness of greater than 0 nm, about 0.5 nm or greater, about 1 nm or greater, about 1.5 nm or greater, about 2 nm or greater, about 20 nm or less, about 18 nm or less, about 15 nm or less, about 10 nm or less, or about 5 nm or less.

The fluorite-based material thin film may include a material represented by $MO_2$, wherein M is Hf, Zr, or a combination of Hf and Zr. In addition, the fluorite-based material thin film may include, as a base material, a material represented by $MO_2$, wherein M is Hf, Zr, or a combination of Hf and Zr, and may further include one or more dopant materials selected from the group consisting of or including C, Si, Ge, Sn, Pb, Al, Y, La, Gd, Mg, Ca, Sr Ba, Ti, and a combination thereof. The amount of the dopant material may be greater than 0 at %, about 0.2 at % or greater, about 0.5 at % or greater, about 1 at % or greater, about 2 at % or greater, about 3 at % or greater, about 4 at % or greater, about 5 at % or greater, about 20 at % or less, about 18 at % or less, about 15 at % or less, about 12 at % or less, about 10 at % or less, about 8 at % or less, about 7 at % or less, or about 6 at % or less, with respect to the metal element of the base material.

The orthorhombic crystal structure and/or atomic arrangement of the fluorite-based material thin film may be identified using a method, such as for example, at least one of scanning transmission electron microscopy (STEM), transmission electron microscopy (TEM), grazing incidence X-ray diffraction (GIXRD), and/or the like.

The fluorite-based material thin film may include an orthorhombic crystal phase including the orthorhombic crystal structure. For example, the fluorite-based material thin film may include various crystal phases such as an orthorhombic crystal phase and a tetragonal crystal phase, but may predominantly include the orthorhombic crystal phase (the largest or highest proportion of all crystal phases, or the crystal phase of a plurality of all crystal phases).

The fluorite-based material thin film having ferroelectricity may be manufactured or fabricated by forming an amorphous layer including a desired composition, and annealing the same.

The annealing process may be performed with at least one of a furnace annealing process, a rapid thermal annealing (RTA) process, or a laser annealing (LA) process; however, example embodiments are not limited thereto.

The amorphous layer including a desired composition may be formed using a deposition process such as at least one of a chemical vapor deposition (CVD) process, an atomic layer deposition (ALD) process, a plasma enhanced chemical vapor deposition (PECVD) process, or a low pressure chemical vapor deposition (LPCVD) process; however, example embodiments are not limited thereto. For example, an atomic layer deposition (ALD) method has advantages in that a uniform layer may be formed at an atomic level and may be performed at a relatively low temperature.

When the amorphous layer is formed by the ALD method, precursors may be used for a hafnium source, a zirconium source, and an oxygen source. For example, as the hafnium source, at least one selected from the group consisting of $Hf(OtBu)_4$, tetrakis ethylmethylamino hafnium (TEMAH), dimethylamino hafnium (TDMAH), tetrakis diethylamino hafnium (TDEAH), and/or a combination thereof may be used. However, examples of the hafnium source are not limited thereto. In addition, as the zirconium source, at least one selected from the group consisting of or including $Zr(OtBu)_4$, tetrakis ethylmethylamino zirconium (TEMAZ), tetrakis dimethylamino zirconium (TDMAZ), tetrakis diethylamino zirconium (TDEAZ), and a combination thereof may be used. However, examples of the zirconium source are not limited thereto. In addition, as the oxygen source, at least one selected from the group consisting of or including $O_3$, $H_2O$, $O_2$, $N_2O$, $O_2$ plasma, and a combination thereof may be used. However, examples of the oxygen source are not limited thereto.

For the annealing step, any or all of the temperature, time, atmosphere, and the like may be controlled such that the fluorite-based amorphous layer is crystallized with an orthorhombic crystal structure. A thermal budget of the annealing step may be determined in consideration of the composition and/or thickness of the fluorite-based amorphous layer. The annealing may be performed at a temperature of about 400° C. to about 1100° C., but is not limited thereto. The annealing may be performed for a period of time of about 1 nanosecond or greater, about 1 microsecond or greater, about 0.001 seconds or greater, about 0.01 seconds or greater, about 0.05 seconds or greater, about 0.1 seconds or greater, about 0.5 seconds or greater, about 1 second or greater, about 3 seconds or greater, about 5 seconds or greater, about 10 minutes or less, about 5 minutes or less, about 1 minute or less, or about 30 seconds or less, but is not limited thereto. The annealing step may include a first annealing step and a second annealing step. For example, the first annealing step may be performed at a lower temperature and/or for a shorter time than that of the second annealing step. The atmosphere in which the annealing is performed is not particularly limited. For example, the first annealing may be performed under an atmosphere of at least one of $H_2O$, $O_2$, $O_3$, $N_2$, $H_2$, and/or $NH_3$.

Alternatively or additionally, an electric field having an appropriate magnitude and/or direction may be applied locally, such that the fluorite-based material thin film has a desired atomic arrangement and/or domain arrangement. For example, by applying an external electric field having an appropriate direction and/or magnitude to a local region of the fluorite-based material thin film having the repeating symmetric segments and non-symmetric segments, the fluorite-based material thin film may be controlled such that the corresponding region does not have the symmetric segment, or has consecutive symmetric segments.

A device according to some example embodiments may be or may include a memory device or non-memory device, for example, may be or may include, but not limited to, a capacitor, an electric field-effect transistor, a diode, or a combination structure thereof.

The semiconductor device may have an improved or excellent polarization switching rate, as compared with a semiconductor device of a related art. FIG. 5 shows graphs showing results of calculating polarization switching times of a known fluorite-based material thin film and the fluorite-based material thin films according to some example embodiments. Referring to FIG. 5, for the fluorite-based material thin film (solid line) according to some example embodiments, having an atomic arrangement and domain wall propagation as shown in FIG. 3, the polarization direction switching time is generally shorter than that of a related art (broken line) having an atomic arrangement and domain wall propagation as shown in FIG. 2. For example, a total polarization switching time of the semiconductor device according to some example embodiments (solid line) may be less than $1.0 \times 10^{-7}$ sec. Alternatively or additionally, the semiconductor device according to some example embodiments may have a peak or a local peak at $5.0 \times 10^{-7}$ sec or less when polarization is switched, in a graph of current with respect to time. The peak may have a shape of skewness distribution. For example, the peak may be left-skewed. The peak may be a local peak, e.g. a local maximum; however, example embodiments are not limited thereto, and the peak may be a global maximum.

Figure 6:
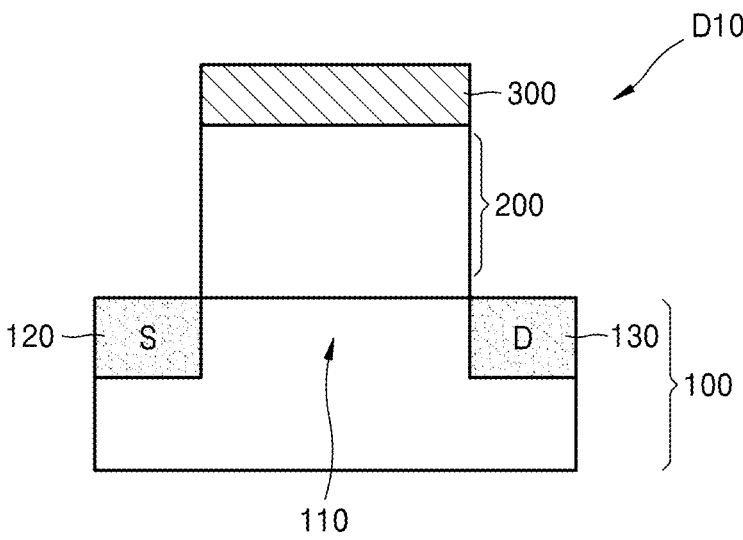
FIGS. 6, 7, and 8 are schematic views showing field-effect transistors (FETs) according to embodiments.
Figure 7:
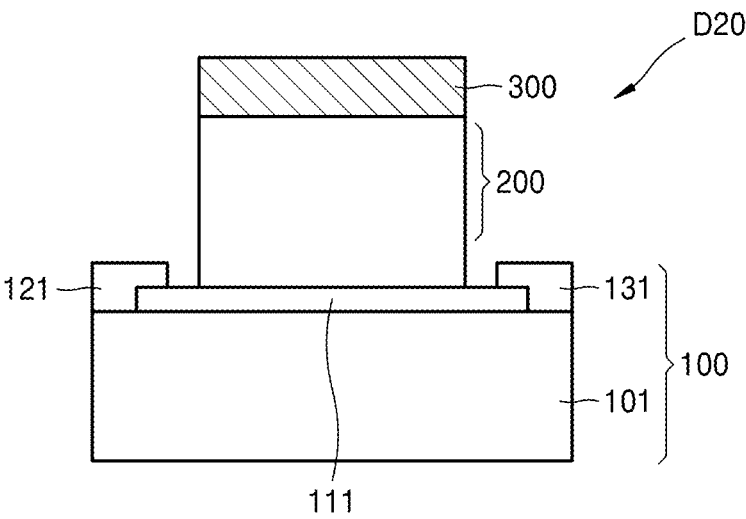

FIGS. 6 and 7 are schematic views showing field-effect transistors (FETs) D10 and D20 according to some example embodiments. Referring to FIGS. 6 and 7, the FETs D10 and D20 each includes a substrate including a source 120/121 and a drain 130/131, a gate electrode 300 arranged on the substrate 100, and a fluorite-based material thin film 200 arranged between the substrate and the gate electrode 300. The FETs D10 and D20 may be or may correspond to logic switching devices. The logic switching devices, having a concept in contrast to memory devices (memory transistors), may have non-memory characteristics, and may be non-memory ON/OFF switching devices.

The substrate 100 may include a semiconductor material. For example, the substrate 100 may include Si, Ge, SiGe, a Group III-V semiconductor, or the like, and may be modified and used in various forms such as a silicon on insulator (SOI).

The substrate 100 may include the source 120 (121) and the drain 130 (131), and may include a channel 110 (111) electrically connected to or contact or directly contact the sources 120 (121) and the drain 130 (131). The source 120 (121) may be electrically connected to or contact or directly contact one end of the channel 110 (111), and the drain 130 (131) may be electrically connected or contact or directly contact the other end of the channel 110 (111).

Referring to FIG. 6, the channel 110 may be defined as a substrate region between the source 120 and the drain 130 in the substrate 100. The source 120 and the drain 130 may be formed by incorporating/implanting impurities into different regions of the substrate 100. In this case, the source 120, the channel 110, and the drain 130 may include a substrate material as a base material.

The source 120 and the drain 130 may be implanted with an impurity having a first conductivity, and the channel 110 may be implanted with an impurity having a second polarity, opposite to the first polarity. However, example embodiments are not limited thereto. For example, the source 120 and/or the drain 130 may be implanted with boron, and the channel 110 may be implanted with phosphorus and/or arsenic; however, example embodiments are not limited thereto. Alternatively or additionally, the source 120 and/or the drain 130 may be implanted with phosphorus and/or arsenic, and the channel 110 may be implanted with boron; however, example embodiments are not limited thereto.

In addition, referring to FIG. 7, the channel 111 may be implemented as a substrate region 101 and a separate material layer (thin film). The material composition of the channel 111 may vary. For example, the channel 111 may include not only a semiconductor material such as a single-crystal or polycrystalline semiconductor material, such as doped or undoped Si, Ge, SiGe, Group III-V, and/or the like, but also at least one selected from the group consisting of or including an oxide semiconductor, a nitride semiconductor, an oxynitride semiconductor, a two-dimensional (2D) material, a quantum dot, an organic semiconductor, and combinations thereof. For example, the oxide semiconductor may include InGaZnO, or the like, the 2D material may include transition metal dichalcogenide (TMD) or graphene, and the quantum dot may include colloidal QD, nanocrystal structure, or the like. In addition, the source 121 and the drain 131 may include a conductive material, and, for example, may each independently include a metal, a metal compound, or a conductive polymer.

Referring to FIGS. 6 and 7, the gate electrode 300 may be arranged on the substrate 100, spaced apart from the substrate 100, and may be arranged so as to face the channel 110 and 111. The gate electrode 300 may have a conductivity of approximately 1 Mohm/square or less; however, example embodiments are not limited thereto. The gate electrode 300 may include at least one selected from the group consisting of or including metal, metal nitride, metal carbide, polysilicon, and combinations thereof. For example, the metal may include aluminum (Al), tungsten (W), molybdenum (Mo), titanium (Ti), or tantalum (Ta), the metal nitride film may include a titanium nitride (TiN) film or a tantalum nitride (TaN) film, and the metal carbide may be an aluminum or silicon-doped (or including) metal carbide, and may include, for example, TiAlC, TaAlC, TiSiC, or TaSiC. The gate electrode 300 may have a structure in which a plurality of materials are stacked. For example, the gate electrode 300 may have a stack structure of a metal nitride layer/metal layer such as TiN/Al, or a stack structure of a metal nitride layer/metal carbide layer/metal layer such as TiN/TiAlC/W. The gate electrode 300 may include a titanium nitride film (TiN) or molybdenum (Mo). Example embodiments described above may be used in various modifications.

The fluorite-based material thin film 200 may be arranged between the substrate 100 and the gate electrode 300. For example, the fluorite-based material layer 200 may be formed on the channel 110 and 111. For the fluorite-based material thin film 200, the description above may be referred to.

Figure 8:
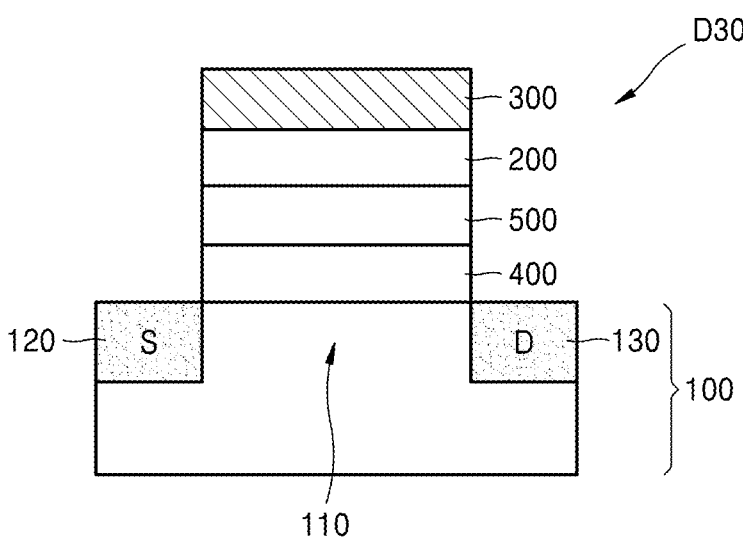

FIG. 8 is a schematic view illustrating a semiconductor device D30 (a field-effect transistor) according to some example embodiments. Referring to FIG. 8, a dielectric layer 400 may be further included between the channel 110 and the fluorite-based material thin film 200. The dielectric layer 400 may suppress or prevent electrical leakage. A thickness of the dielectric layer 400 may be about 0.1 nm or greater, about 0.3 nm or greater, or about 0.5 nm or greater, or may be about 5 nm or less, about 4 nm or less, about 3 nm or less, about 2 nm or less, or about 1 nm or less. The dielectric layer 400 may include a paraelectric material or a high-dielectric material, and may include silicon oxide, silicon nitride, aluminum oxide, hafnium oxide, zirconium oxide, or the like, and/or may include a 2D insulator such as a hexagonal boron nitride (h-BN). For example, the dielectric layer 400 may include silicon oxide ($SiO_2$), silicon nitride ($SiN_x$), or the like. Alternatively or additionally, the dielectric layer 400 may include at least one of hafnium oxide ($HfO_2$), hafnium silicon oxide ($HfSiO_4$), lanthanum oxide ($La_2O_3$), lanthanum aluminum oxide ($LaAlO_3$), zirconium oxide ($ZrO_2$), zirconium silicon oxide ($ZrSiO_4$), tantalum oxide ($Ta_2O_5$), titanium oxide ($TiO_2$), strontium titanium oxide ($SrTiO_3$), yttrium oxide ($Y_2O_3$), aluminum oxide ($Al_2O_3$), red scandium tantalum oxide ($PbSc_{0.5}Ta_{0.5}O_3$), red zinc niobate ($PbZnNbO_3$), or the like Alternatively or additionally, the dielectric layer 400 may include at least one of metal nitride oxide such as at least one of aluminum oxynitride (AlON), zirconium oxynitride (ZrON), hafnium oxynitride (HfON), lanthanum oxynitride (LaON), yttrium oxynitride (YON), or the like; silicate such as ZrSiON, HfSiON, YSiON, LaSiON, or the like; or aluminate such as ZrAlON, HfAlON, or the like.

Referring to FIG. 8, a conductive layer 500 may be further included between the channel 110 and the fluorite-based material thin film 200. The conductive layer 500 may have a conductivity of approximately about 1 Mohm/square; however, example embodiments are not limited thereto. The conductive layer 500 may be a floating electrode, and may include a metal or a metal compound; however, example embodiments are not limited thereto.

The field-effect transistor may be implemented in various forms, such as a 2-dimensional form or a 3-dimensional form. For example, the field-effect transistor may be of a 1-gate on channel type such as a planar-FET, a 3-gate on channel type such as a fin-FET, or a 4-gate on channel type such as a gate-all-around-FET, such as a multi-bridge channel FET (MBCFET™).

Figure 9:
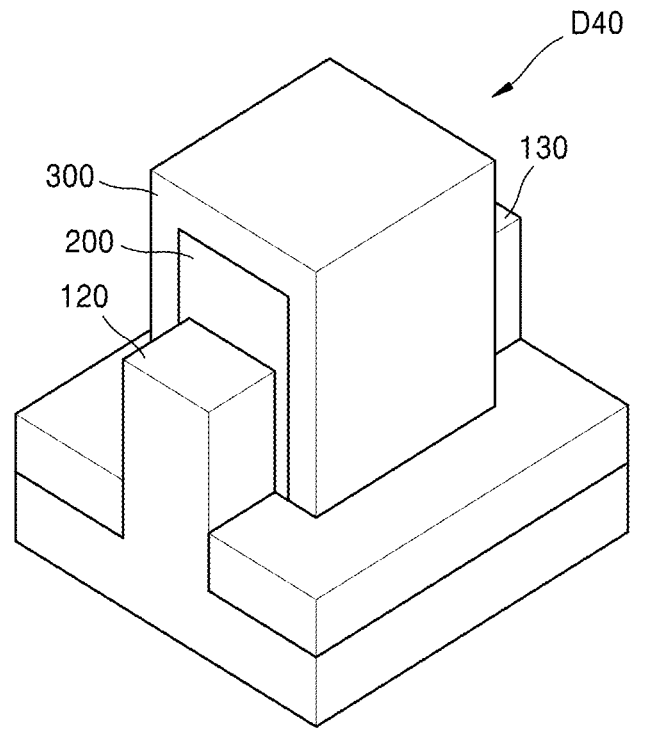
FIGS. 9 and 10 are schematic views showing FETs according to other embodiments.

FIG. 9 is a schematic view showing a semiconductor device (specifically, a fin-FET D40) according to some example embodiment. Referring to FIG. 9, the fin-FET D40 may include a source 120, a drain 130, and a channel (not shown) as a region defined between the source 120 and the drain 130, and the channel may have a fin shape. The gate electrode 300 may be arranged on a substrate (not shown)

having a fin shape so as to cross the fin shape. The channel may be formed in a region where the fin shape and the gate electrode 300 cross each other. The fluorite-based material thin film 200 may be arranged between the channel and the gate electrode 300 so as to surround the channel. The fin-FET may be a pi-gate fin-FET, an omega-gate fin-FET, and/or a tri-gate fin-FET; however, example embodiments are not limited thereto.

Figure 10:
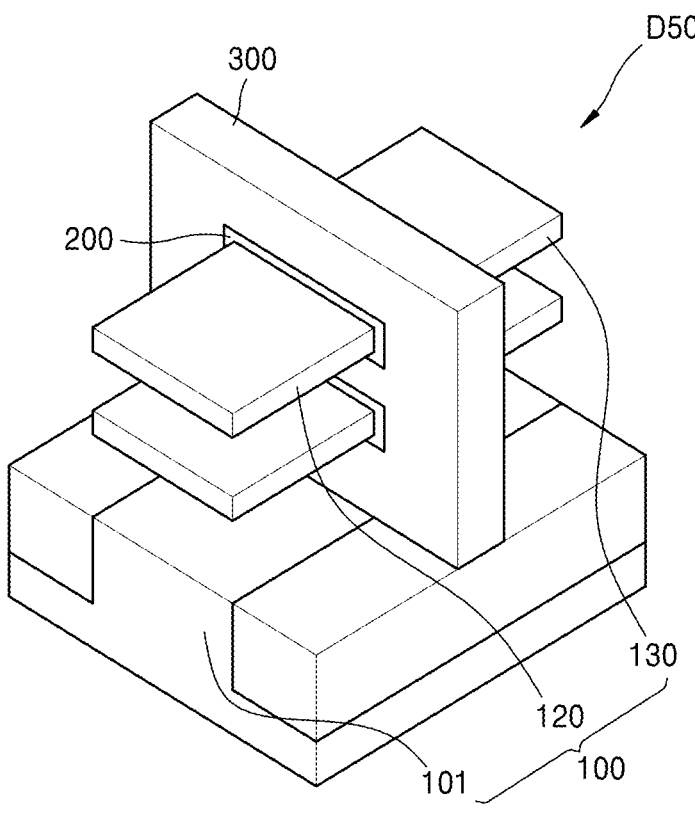

FIG. 10 is a schematic view showing a semiconductor device (specifically, a gate-all-around-FET D50 such as an MBCFET™) according to some example embodiments. Referring to FIG. 10, the gate-all-around-FET D50 may include a source 120, a drain 130, and a channel (not shown) as a region defined therebetween, and the channel may have a shape such as a wire or a sheet. The source 120, the drain 130, and the channel may be arranged to be spaced apart from a substrate region 101. A gate electrode 300 may be arranged so as to surround the source 120, the drain 130, and the channel while crossing the source 120, the drain 130, and the channel. The channel may be formed in a region surrounded by the gate electrode 300. Specifically, the fluorite-based material layer 200 may be arranged between the channel and the gate electrode 300 to surround the channel.

Figure 11:
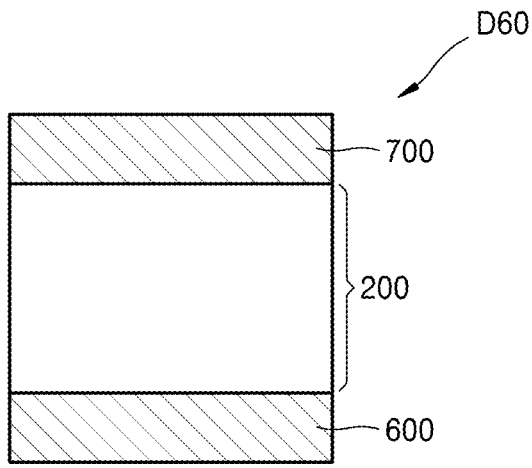
FIG. 11 is a schematic view showing a capacitor according to some example embodiments.

FIG. 11 is a schematic view showing a capacitor D60 according to some example embodiments. Referring to FIG. 11, the capacitor D60 includes a first electrode 600, a second electrode 700 arranged to face and be spaced apart from the first electrode 600, and the fluorite-based material layer 200 arranged between the first electrode 600 and the second electrode 700. The first electrode 600 and the second electrode 700 may be referred to as a lower electrode and an upper electrode, respectively.

The first electrode 600 and the second electrode 700 may have a conductivity of about 1 Mohm/square or less; however, example embodiments are not limited thereto, and may include or consist of a same material or different materials. For example, the first electrode 600 and the second electrode 700 may each independently include at least one of TiN, TaN, Ti, Ta, TiCN, TiSiN, WSiN, TiAlN, TaAlN, TiAlCN, TiW, RuTiN, RuCN, Pt, Au, Mo or Al. As a specific example, the first electrode 600 and the second electrode 700 may each independently include TiN and/or Mo. A thickness of the first electrode 600 and the second electrode 700 may be equal to or greater than about 1 nm and less than or equal to about 20 nm, and may be the same as, or different from, one another.

Figure 12:
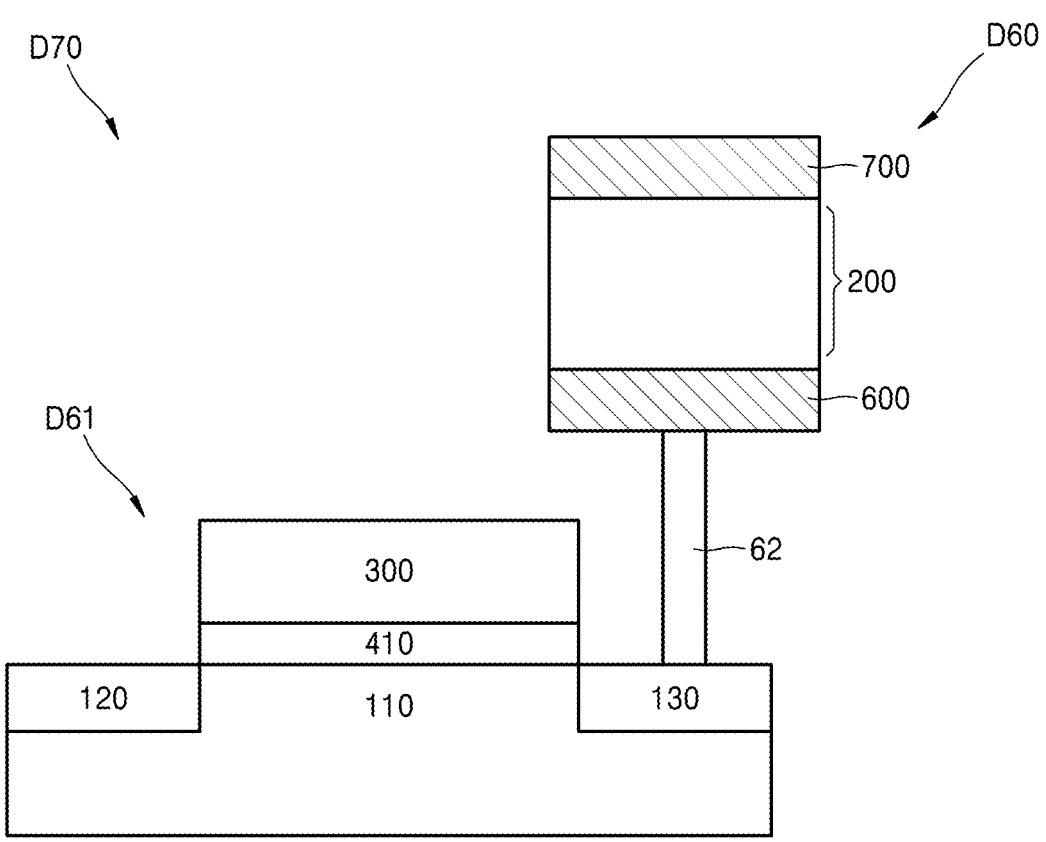
FIG. 12 is a schematic view showing a semiconductor apparatus (a connection structure between a capacitor and a FET) according to some example embodiments.

According to some example embodiments, a semiconductor apparatus including the fluorite-based material thin film and/or semiconductor device as described above may be provided. The semiconductor apparatus may include a plurality of semiconductor devices, and may be in a form in which a field-effect transistor and a capacitor are electrically connected. The semiconductor apparatus may have memory characteristics, and may be, for example, a DRAM that may be volatile or non-volatile. FIG. 12 is a schematic view showing a semiconductor apparatus D70 (a connection structure between a capacitor D60 and a FET D61) according to some example embodiments. Referring to FIG. 12, the semiconductor apparatus D70 may be a structure in which the capacitor D60 including the fluorite-based material thin film 200 and the FET D61 are connected by a contact 62. For example, one of the electrodes 600 and 700 of the capacitor D60 and one of the source/drain 120 and 130 of the field-effect transistor D61 may be electrically connected by the contact 62. The contact 62 may include an appropriate conductive material, for example, at least one of tungsten, copper, aluminum, doped or undoped polysilicon, or the like.

The FET D61 may include a substrate 100 including the source 120, the drain 130, and a channel 110, and the gate electrode 300 arranged to face the channel 110. A dielectric layer 410 may be further included between the substrate 100 and the gate electrode 300. Although the FET D61 of FIG. 12 does not include the fluorite-based material thin film 200, the FET D61 may include the fluorite-based material thin film 200 as shown in FIG. 5. The source 120, the drain 130, the channel 110, the substrate 100, and the gate electrode 300 may be the same as those described above. For the dielectric layer 410, the description of the dielectric layer 400 provided above may be referred to.

The arrangement of the capacitor D60 and the FET D61 may be variously modified. For example, the capacitor D60 may be arranged on the substrate 100, or, alternatively, may be buried in the substrate 100.

The semiconductor device and semiconductor apparatus according to some example embodiments may be applied to various electronic apparatuses. For example, the above-described FET and capacitor, or a combination thereof may be applied as a logic device or a memory device in various electronic apparatuses. The semiconductor device according to some example embodiments has advantages in terms of efficiency, speed, and/or power consumption, and thus may meet or help to meet the demand for miniaturization and/or integration of electronic devices. For example, semiconductor devices and semiconductor apparatuses may be used for arithmetic operations, program execution, temporary data retention, etc. in electronic devices such as mobile devices, computers, notebook computers, sensors, network devices, neuromorphic devices, etc. The semiconductor device and semiconductor apparatus according to some example embodiments may be useful for electronic apparatuses in which the amount of data transmission is large and data transmission is continuously performed.

Figure 13:
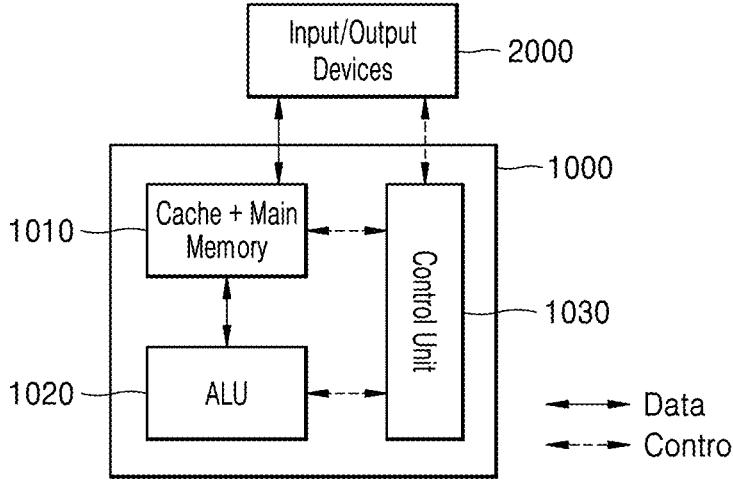
FIGS. 13 and 14 are conceptual views schematically showing an electronic device architecture applicable to an electronic apparatus, according to some example embodiments.
Figure 14:
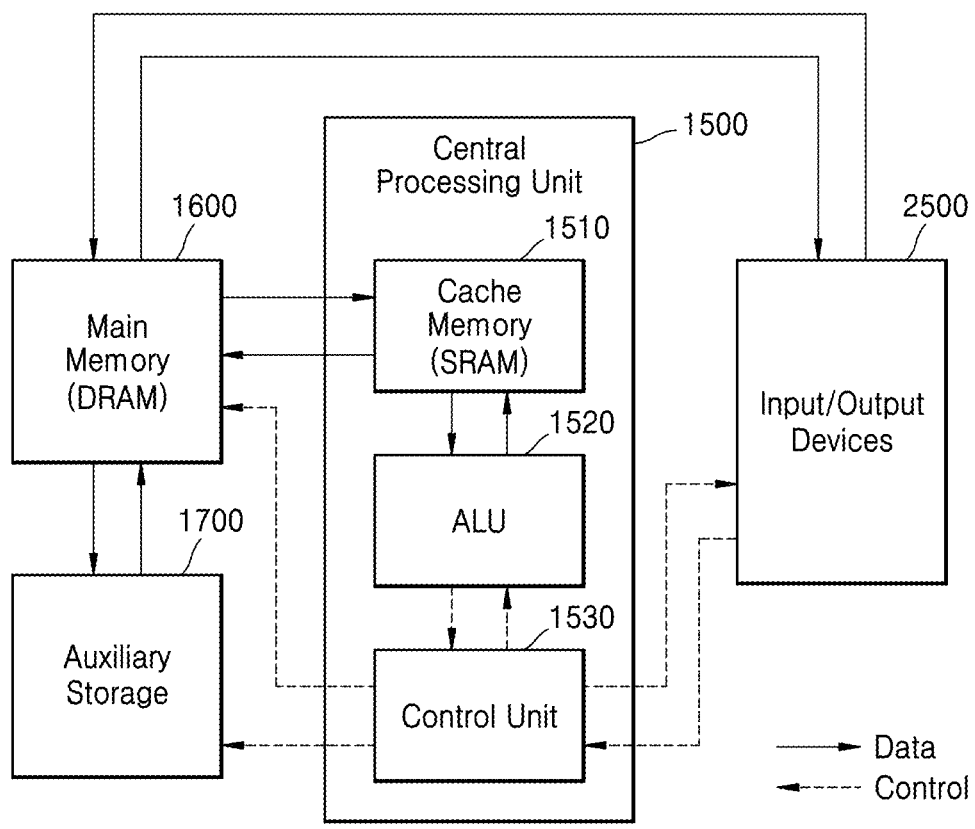

FIGS. 13 and 14 are conceptual views schematically showing an electronic device architecture 1000 applicable to an electronic apparatus, according to some example embodiments.

Referring to FIG. 13, the electronic device architecture 1000 may include a memory unit 1010, an arithmetic logic unit (ALU) 1020, and a control unit 1030. The memory unit 1010, the ALU 1020, and the control unit 1030 may be electrically connected to each other. For example, the electronic device architecture 1000 may be implemented as a single chip including the memory unit 1010, the ALU 1020, and the control unit 1030. Specifically, the memory unit 1010, the ALU 1020, and the control unit 1030 may be connected to each other through a metal line in an on-chip to communicate directly. The memory unit 1010, the ALU 1020, and the control unit 1030 may be monolithically integrated on one substrate to form a single chip. An input/output device 2000 may be connected to the electronic device architecture (chip) 1000.

The electronic device architecture 100 may include at least one additional active device (e.g., a transistor and/or a diode), in addition to one or more of FETs D10, D20, D30, D40, D50 or capacitor D60. Alternatively or additionally, the electronic device architecture 100 may include at least one additional passive device (e.g., a resistor, a capacitor, an inductor, or a memristor), in addition to one or more of FETs D10, D20, D30, D40, D50 or capacitor D60.

The memory unit 1010, the ALU 1020, and the control unit 1030 may each independently include the semiconductor device (one or more of FETs D10, D20, D30, D40, D50, or capacitor D60, etc.) described above. For example, the ALU 1020 and the control unit 1030 may each independently include the FET described above, and the memory unit 1010 may be the capacitor or FET described above, or a combination thereof. The memory unit 1010 may include both a main memory and a cache memory. The electronic device architecture (chip) 1000 may be or may include an on-chip memory processing unit.

Referring to FIG. 14, a cache memory 1510, an ALU 1520, and a control unit 1530 may constitute a central processing unit (CPU) 1500. The cache memory 1510 may be composed of a static random access memory (SRAM), and may include one or more of the FETs D10, D20, D30, D40, or D50 described above. Apart from the CPU 1500, a main memory 1600 and an auxiliary storage 1700 may be provided. The main memory 1600 may be composed of a dynamic random access memory (DRAM) and may include the capacitor D60 described above.

In some cases, the electronic device architecture 1000 may be implemented in a form in which computing unit devices and memory unit devices are adjacent to each other on a single chip, without division of sub-units.

[GH1]The first and second pocket regions 127 and 137 may be doped with, e.g. implanted with, a second impurity. The conductivity type of the second impurity may be different from, or opposite to, the conductivity type of the first impurity.

As described above, according to the one or more example embodiments, a fluorite-based material thin film having ferroelectricity and/or excellent polarization switching rate may be provided. As described above, according to the one or more example embodiments, a semiconductor device having an improved operation rate and/or high capacitance may be provided. The fluorite-based material thin film and semiconductor element may be applicable to various electronic devices, electronic apparatuses, electronic circuits, and/or the like. Some example embodiments may be applicable to other films, such as other thin-films having an anti-fluorite structure.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

It should be understood that some example embodiments described herein should be considered in a descriptive sense only and not for purposes of limitation. Descriptions of features or aspects within each example embodiment should typically be considered as available for other similar features or aspects in other embodiments. While one or more example embodiments have been described with reference to the figures, it will be understood by those of ordinary skill in the art that various changes in form and details may be made therein without departing from the spirit and/or scope as defined by the following claims.

What is claimed is:

1. A fluorite-based material thin film comprising:
an orthorhombic crystal structure having a symmetric segment and a non-symmetric segment; and
at least two domains having different polarization directions,
wherein,
(A) the symmetric segment is not present at a wall between the at least two domains, or
(B) at least two of the symmetric segment are consecutively adjacent.

2. The fluorite-based material thin film of claim 1, wherein the symmetric segment includes, in a crystal lattice having four oxygen ions and two metal ions, an atomic arrangement structure in which positions of the metal ions and the oxygen ions have symmetry with respect to a polar c-axis.

3. The fluorite-based material thin film of claim 1, wherein the non-symmetric segment includes, in a crystal lattice having four oxygen ions and two metal ions, an atomic arrangement structure in which positions of the metal ions and the oxygen ions have non-symmetry with respect to a polar c-axis.

4. The fluorite-based material thin film of claim 1, wherein each of the at least two domains is a set of adjacent orthorhombic crystal structures having a same polarization direction.

5. The fluorite-based material thin film of claim 1, wherein the fluorite-based material thin film comprises an atomic arrangement represented by $U-S_x-D$, wherein S is the symmetric segment, x is an integer of 0, 2, 3, 4, or 5, and U and D are domains having different polarization directions from each other.

6. The fluorite-based material thin film of claim 5, wherein U and D have a same chirality.

7. The fluorite-based material thin film of claim 5, wherein each of U and D is a domain with an atomic arrangement in which the non-symmetric segment is arranged adjacent to $S_x$.

8. The fluorite-based material thin film of claim 1, wherein the orthorhombic crystal structure comprises a material represented by $MO_2$, wherein M is Hf, Zr, or a combination of Hf or Zr.

9. The fluorite-based material thin film of claim 1, wherein the orthorhombic crystal structure comprises:
as a base material, a material represented by $MO_2$, wherein M is Hf, Zr, or a combination of Hf and Zr; and
at least one dopant material selected from the group including C, Si, Ge, Sn, Pb, Al, Y, La, Gd, Mg, Ca, Sr Ba, Ti.

10. The fluorite-based material thin film of claim 9, wherein an amount of the at least one dopant material is greater than 0 at % and less than or equal to 20 at %, the amount with respect to a metal element of the base material.

11. The fluorite-based material thin film of claim 1, wherein the thin film has a thickness greater than 0 nm and less than or equal to 20 nm.

12. The fluorite-based material thin film of claim 1, wherein the fluorite-based material thin film exhibits ferroelectricity.

13. An electronic device comprising:
the fluorite-based material thin film of claim 1; and
at least one active or passive element.

* * * * *